United States Patent
Herbst et al.

(10) Patent No.: US 7,508,618 B1
(45) Date of Patent: Mar. 24, 2009

(54) MULTIVARIATE HEAD-TO-DISK CONTACT DETECTION

(76) Inventors: Gary A. Herbst, 729 Potomac Ct., San Jose, CA (US) 95136; Bernhard E. Knigge, 776 Dubanski Dr., San Jose, CA (US) 95123; Michael A. Moser, 910 Briana Ct., San Jose, CA (US) 95120; Bruce A. Wilson, 254 Martinvale La., San Jose, CA (US) 95119

( * ) Notice: Subject to any disclaimer, the term of this patent is extended or adjusted under 35 U.S.C. 154(b) by 0 days.

(21) Appl. No.: 11/965,637

(22) Filed: Dec. 27, 2007

(51) Int. Cl.
G11B 21/02 (2006.01)
G11B 27/36 (2006.01)

(52) U.S. Cl. .......................................... 360/75; 360/31
(58) Field of Classification Search ...................... None
See application file for complete search history.

(56) References Cited

U.S. PATENT DOCUMENTS

| | | | |
|---|---|---|---|
| 4,809,248 A | 2/1989 | Sengoku | |
| 5,473,320 A | 12/1995 | Dunn et al. | |
| 5,539,592 A | 7/1996 | Banks et al. | |
| 5,589,996 A | 12/1996 | Patrick et al. | |
| 5,742,446 A | 4/1998 | Tian et al. | |
| 7,095,578 B2 | 8/2006 | Ma | |
| 7,158,325 B1 * | 1/2007 | Hu et al. | 360/69 |
| 7,286,315 B2 | 10/2007 | Ryu | |
| 2002/0054446 A1 * | 5/2002 | Smith | 360/73.03 |
| 2007/0230034 A1 * | 10/2007 | Kondo | 360/78.04 |
| 2007/0236821 A1 | 10/2007 | Ma et al. | |
| 2007/0268605 A1 | 11/2007 | Ryu | |
| 2007/0291401 A1 * | 12/2007 | Sun et al. | 360/75 |

FOREIGN PATENT DOCUMENTS

| | | |
|---|---|---|
| JP | 54061913 | 5/1979 |
| JP | 4330608 | 11/1992 |

OTHER PUBLICATIONS

Hard Disk Spindle Motor Current Logging, RD 433133 A, Derwent-Week 200041.

* cited by examiner

*Primary Examiner*—Andrew L Sniezek

(57) ABSTRACT

Magnetic disk drive systems and associated methods are described for precisely detecting contact of read/write elements of a recording head with a magnetic disk due to increasing a heating power applied to heating elements in the recording head. Contact is detected based on adjusted timing signals which are generated by measuring the current applied to a spindle motor, and generating an estimated timing signal from the measured motor current for increments of the heating power. An actual servo timing signal is simultaneously measured from servo fields on the magnetic disk, and the adjusted timing signals are calculated based on the difference between the estimated timing signal and the servo timing signal. Multivariate statistical analysis may also be performed on the adjusted timing signals and other contact indicative variables (such as off-track and slider vertical bouncing) to generate a likelihood of contact at the increments of the heating power.

18 Claims, 8 Drawing Sheets

MULTIVARIATE HEAD-TO-DISK CONTACT DETECTION

BACKGROUND OF THE INVENTION

1. Field of the Invention

The invention is related to the field of magnetic disk drive systems and, in particular, to more precisely detecting contact between a recording head and a magnetic disk in a magnetic disk drive system.

2. Statement of the Problem

Many computer systems use magnetic disk drives for mass storage of information. Magnetic disk drives typically include one or more recording heads (sometimes referred to as sliders) that include read elements and write elements. An actuator/suspension arm holds the recording head above a magnetic disk. When the magnetic disk rotates, an air flow generated by the rotation of the magnetic disk causes an air bearing surface (ABS) side of the recording head to fly a particular height above the magnetic disk. The height to which the recording head flies depends on the shape of the ABS. As the recording head flies on the air bearing, a voice coil motor (VCM) moves the actuator/suspension arm to position the read element and the write element over selected tracks of the magnetic disk.

The magnetic disk includes data regions and servo regions. The servo regions are used to provide sector information, timing information, positioning information, etc. For example, as the magnetic disk makes a revolution, the read element passes over burst fields in the servo regions. The signal read from the burst fields may be used to generate a timing signal. The signal read from the burst fields may also be used to generate a quadrature signal that is used for centering the read element and write element over the center of a track. The information read from the servo regions may be generally referred to as servo data. The servo data is feed back to a control system, which controls the VCM, controls the rotational speed of the magnetic disk, etc.

One factor that contributes to the effective reading and writing by the recording head is the spacing of the read/write elements in relation to the surface of the magnetic disk. The spacing between the read/write elements generally depends on the fly height of the recording head, which is determined by the air bearing surface (ABS) of the recording head. As areal densities of magnetic disk increase, it becomes more important to precisely control spacing of the read/write elements in relation to the magnetic disk, as the spacing may be 10 nanometers or less.

To further control the spacing between the read/write elements and the magnetic disk, some recording heads include heating elements that are fabricated in the recording head proximate to the read/write elements. The read/write elements are fabricated from materials that have a different thermal rate of expansion than the body of the recording head. Thus, when a current is applied to the heating elements, the read/write elements protrude from the ABS of the recording head. Thus, the protrusion causes the read/write elements to extend toward the surface of the magnetic disk, which reduces the spacing between the read/write elements and the magnetic disk. The use of heating elements (sometimes referred to as Thermal Fly-Height Control) allows for more precise spacing between the read/write elements and the magnetic disk.

To calibrate a magnetic disk drive system to have a desired spacing between the read/write elements and the magnetic disk, the control system applies a motor current to a spindle motor which in turn rotates a spindle connected to the magnetic disk. As the magnetic disk rotates, the recording head flies over the surface of the magnetic disk on the air bearing. The control system then incrementally increases the power applied to the heating elements in order to increase the protrusion of the read/write elements. At some threshold heating power being applied to the heating elements, the read/write elements will contact the surface of the magnetic disk. It is desirable to precisely determine the threshold heating power which caused the contact so that slightly lower heating powers may be used to obtain desired spacing between the read/write elements and the magnetic disk during normal operation while avoiding contact with the magnetic disk.

There are a variety of methods of detecting contact between the read/write elements and the magnetic disk so that the threshold heating power may be determined. One method comprises detecting a mechanical vibration in the recording head responsive to the contact between the read/write elements and the magnetic disk. Another method comprises monitoring the motor current being applied to the spindle motor, as the motor current should increase responsive to contact between the read/write elements and the magnetic disk in order to maintain a constant rotational speed. Another method comprises monitoring a servo timing signal read from the servo fields on the magnetic disk, as the servo timing signal should indicate a reduced rotational speed of the magnetic disk responsive to contact between the read/write elements and the magnetic disk. Yet another method comprises monitoring the VCM current to determine if there was a sudden radial movement of the recording head indicating contact with the magnetic disk.

Unfortunately, most of the present methods of detecting contact between the read/write elements and the magnetic disk may not be precise enough as the signals generated in these detection methods tend to have low signal-to-noise ratios (SNR). As a result, the threshold heating power identified as causing the contact between the read/write elements and the magnetic disk may not have the precision desired by disk drive manufacturers. Many interfaces in current disk drives have very little or no bouncing vibrations when at contact. However, every contact causes friction which in turn leads to a slowdown of the RPM. Hence friction based contact detection is more reliable than bounce based detection in most products.

Delayed contact detection caused by poor contact sensitivity may lead to excessive wear and burnishing of the read/write elements which in turn may lead to corrosion and interface failure.

SUMMARY

Embodiments of the invention solve the above and other related problems by generating an adjusted timing signal having a higher SNR to indicate contact between the read/write elements and the magnetic disk. To generate the adjusted timing signal, the motor current applied to the spindle motor is measured, and an estimated timing signal is generated from the measured motor current. For an example of generating the estimated timing signal, the measured motor current may be integrated, and then entered into a least square prediction algorithm to generate the estimated timing signal. An actual servo timing signal is then measured from servo fields on the magnetic disk, and the adjusted timing signal is calculated based on tie difference between the estimated timing signal and the servo timing signal.

This process is performed for incremental heating powers that are applied to the heating elements to generate an adjusted timing signal for the increments of the heating power. The adjusted timing signals have a higher SNR than the servo timing signals, which advantageously allows contact between the read/write elements to be more precisely detected. As a result, the threshold heating power may be more precisely determined so that heavy contact between the read/write element and the magnetic disk may be avoided under normal operation.

Further, multivariate statistical analysis may be performed on the adjusted timing signals and other variables to generate a likelihood of contact at the increments of the heating power. As an example, multivariate statistical analysis may be performed on the sigma, mean, and slope of the adjusted timing signals, the mean and sigma of the current applied to the VCM, the mean and sigma of the Position Error Signal (PES), and the mean and sigma of the servo variable gain amplitude (SVGA) to calculate a likelihood of contact between the read/write elements and the magnetic disk. When a threshold heating power is determined, the likelihood of contact at this threshold heating power may further be considered to indicate the accuracy of the threshold heating power determination.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-12 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those sildled in the art will appreciate that the features described below can be combined in various ways to form multiple variations of the invention. As a result, the invention is not limited to the specific embodiments described below, but only by the claims and their equivalents.

Figure 1:
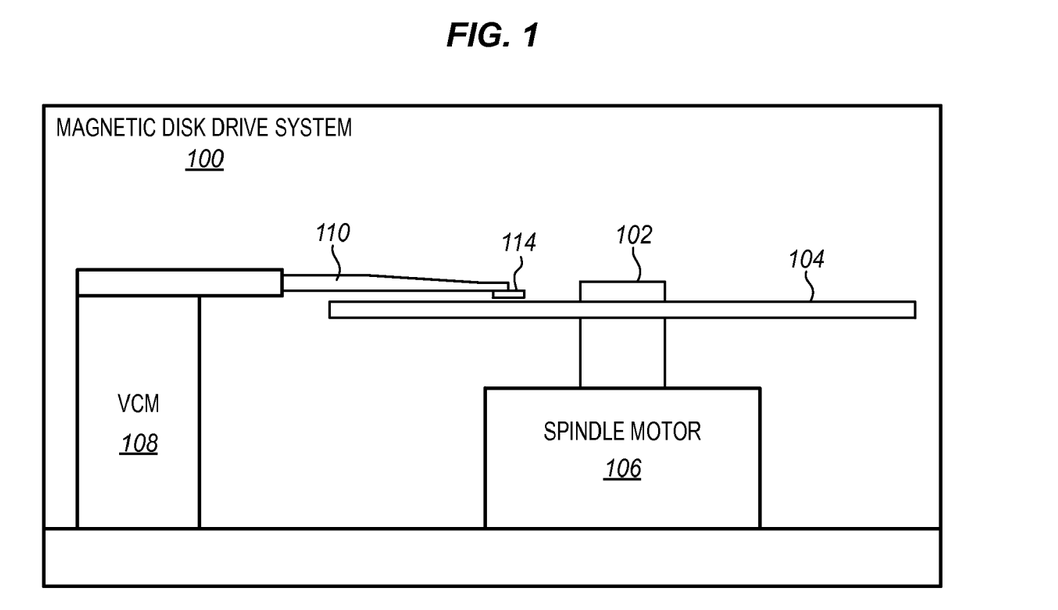
FIG. 1 illustrates a magnetic disk drive system in an exemplary embodiment of the invention.

FIG. 1 illustrates a magnetic disk drive system 100 in an exemplary embodiment of the invention. Magnetic disk drive system 100 includes a spindle 102 that supports a magnetic disk 104. The spindle 102 is connected to a spindle motor 106 that is adapted to rotate spindle 102 responsive to a motor current in order to rotate magnetic disk 104. Magnetic disk drive system 100 further includes an actuator/suspension arm 110 that supports a recording head 114 over the surface of magnetic disk 104. Actuator/suspension arm 110 is connected to a voice coil motor (VCM) 108 that is adapted to pivot actuator/suspension arm 110 responsive to a VCM current in order to position recording head 114 over desired tracks of magnetic disk 104. Magnetic disk drive system 100 may include other devices, components, or systems not shown in FIG. 1. For instance, magnetic disk drive system 100 may include a plurality of magnetic disks 104 connected to spindle 102 and a plurality of actuator/suspension arms 110 supporting recording heads over the surface of the magnetic disks 104.

Figure 2:
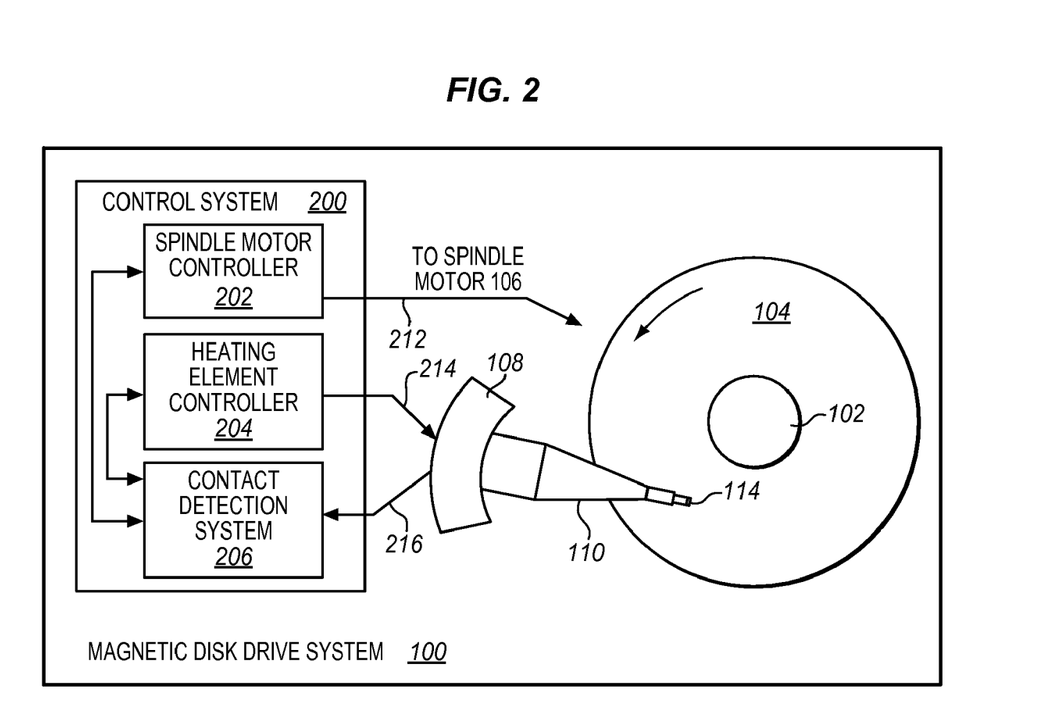
FIG. 2 is a top view of the magnetic disk drive system in an exemplary embodiment of the invention.

FIG. 2 is a top view of magnetic disk drive system 100 in an exemplary embodiment of the invention. In this view, magnetic disk drive system 100 further includes a control system 200. Control system 200 includes a spindle motor controller 202 that is adapted to apply a motor current 212 to spindle motor 106, which controls the rotational speed of magnetic disk 104. Control system 200 further includes a heating element controller 204 that is adapted to apply a heating power 214 to the heating elements (not shown) in recording head 114 in order to control the amount of protrusion of the read/write elements.

Control system 200 further includes contact detection system 206 that is adapted to detect when recording head 114 contacts magnetic disk 104 during a calibration process. Contact detection system 206 may be implemented in hardware, software, firmware, or any combination thereof to provide the desired operation. In order to detect the contact, contact detection system 206 receives data 216 read from magnetic disk 104, and is also adapted to receive other information. For example, the data 216 read from magnetic disk 104 may comprise servo data that is read from servo fields on magnetic disk 104. The operation of contact detection system 206 is further described in FIG. 6.

When magnetic disk 104 rotates, an air flow generated by the rotation of magnetic disk 104 causes an air bearing surface (ABS) of recording head 114 to fly on a cushion of air at a particular height above magnetic disk 104. As recording head 114 flies over the surface of magnetic disk 104, VCM 108 (see FIG. 1) moves actuator/suspension arm 110 to position a read element (not shown) and a write element (not shown) in recording head 114 over selected tracks of magnetic disk 104.

Figure 3:
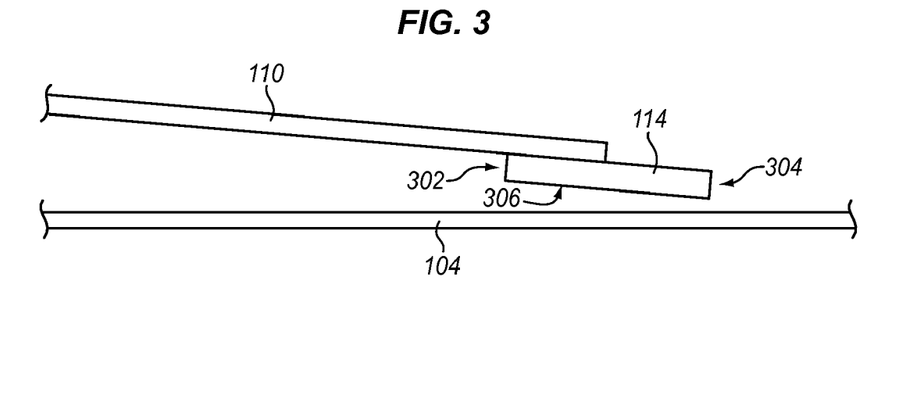
FIG. 3 is a side view of the magnetic disk drive system in an exemplary embodiment of the invention.

FIG. 3 is a side view of magnetic disk drive system 100 in an exemplary embodiment of the invention. Recording head 114 is supported above the surface of magnetic disk 104 by actuator/suspension arm 110. Recording head 114 includes a front end 302 and an opposing trailing end 304. Recording head 114 also includes an air bearing surface 306 that faces toward the surface of magnetic disk 104. A read element (not shown) and a write element (not shown) are formed proximate to the trailing end 304. Recording head 114 also includes one or more heating elements that are fabricated in recording head 114 proximate to the read/write elements. The read/write elements are fabricated from materials that have a different thermal rate of expansion than the body of recording head 114. Thus, when a heating current is applied to the heating elements, the read/write elements protrude from the ABS 306 of recording head 114. Thus, the protrusion causes the read/write elements to extend toward the surface of magnetic disk 104, which reduces the spacing between the read/write elements and magnetic disk 104. The use of heating elements (sometimes referred to as Thermal Fly-Height Control) allows for more precise spacing between the read/write elements and magnetic disk 104.

Figure 4:
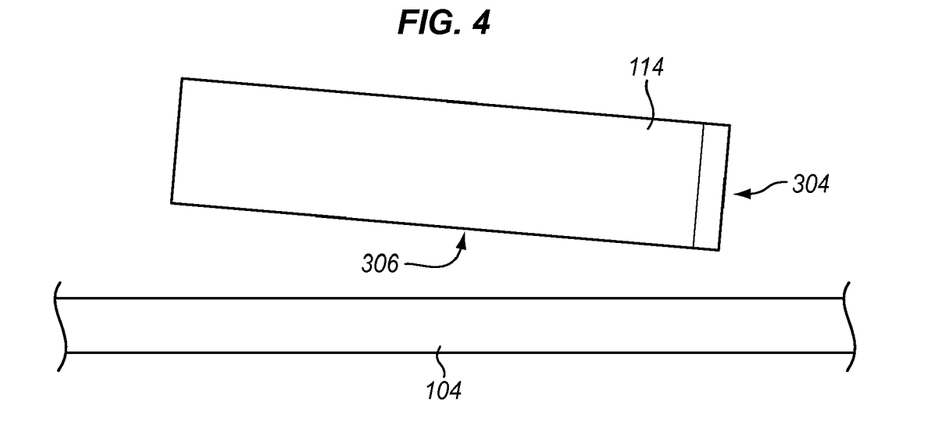
FIGS. 4-5 are side views of a recording head in relation to a magnetic disk in an exemplary embodiment of the invention.
Figure 5:
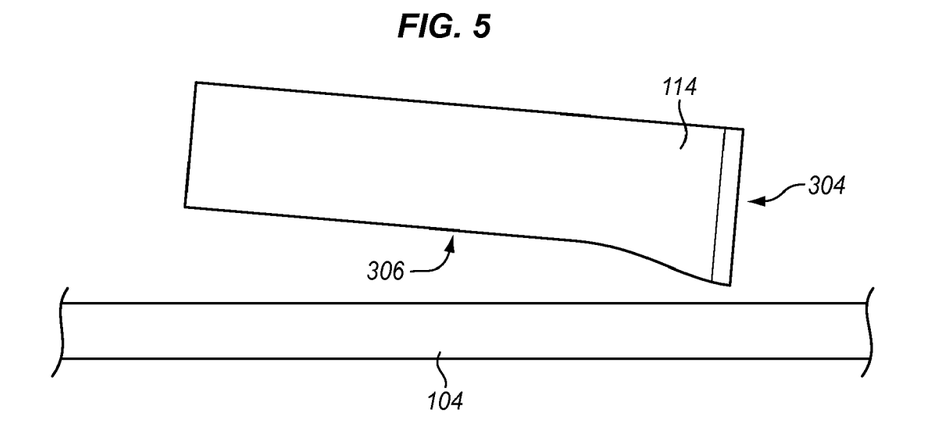

FIG. 4 is a side view of recording head 114 in relation to magnetic disk 104. When no heating power is applied to the heating element in recording head 114, the spacing between read/write elements and magnetic disk 104 is defined by the fly height of recording head 114. When a heating power is applied, the heating elements cause the read/write elements to protrude from the ABS 306 toward the surface of magnetic disk 104. FIG. 5 is another side view of recording head 114 in relation to magnetic disk 104. Due to the protrusion of the read/write elements, the spacing between the read/write elements and the surface of magnetic disk 104 is reduced. Thus, the spacing can be controlled by the amount of heating power applied to the heating elements.

Before magnetic disk drive system 100 is put into operation, it is usually calibrated in order to identify an optimal heating power which produces a desired spacing between the read/write elements and the surface of magnetic disk 104. To calibrate magnetic disk drive system 100, the heating power applied to the heating elements is increased incrementally until the read/write elements contact the surface of magnetic disk 104. The heating power which ultimately results in contact is referred to herein as a threshold heating power. The threshold heating power should be precisely determined to avoid damage to magnetic disk 104 and the read/write elements under normal operation. In order to precisely determine the threshold heating power, contact between the read/write elements should also be precisely detected. FIGS. 6-11 illustrate a process for precisely detecting when there is contact between the read/write elements and magnetic disk 104 during the calibration process. The clearance calibration process occurs usually during manufacturing. However, clearance may be recalibrated due to changes in environmental conditions (such as altitude, temperature, and humidity changes). To avoid excessive wear and slider burnishing as a consequence of multiple slider/disk contacts that occur over the lifetime of the disk drive, very high contact sensitivity is desired.

Figure 6:
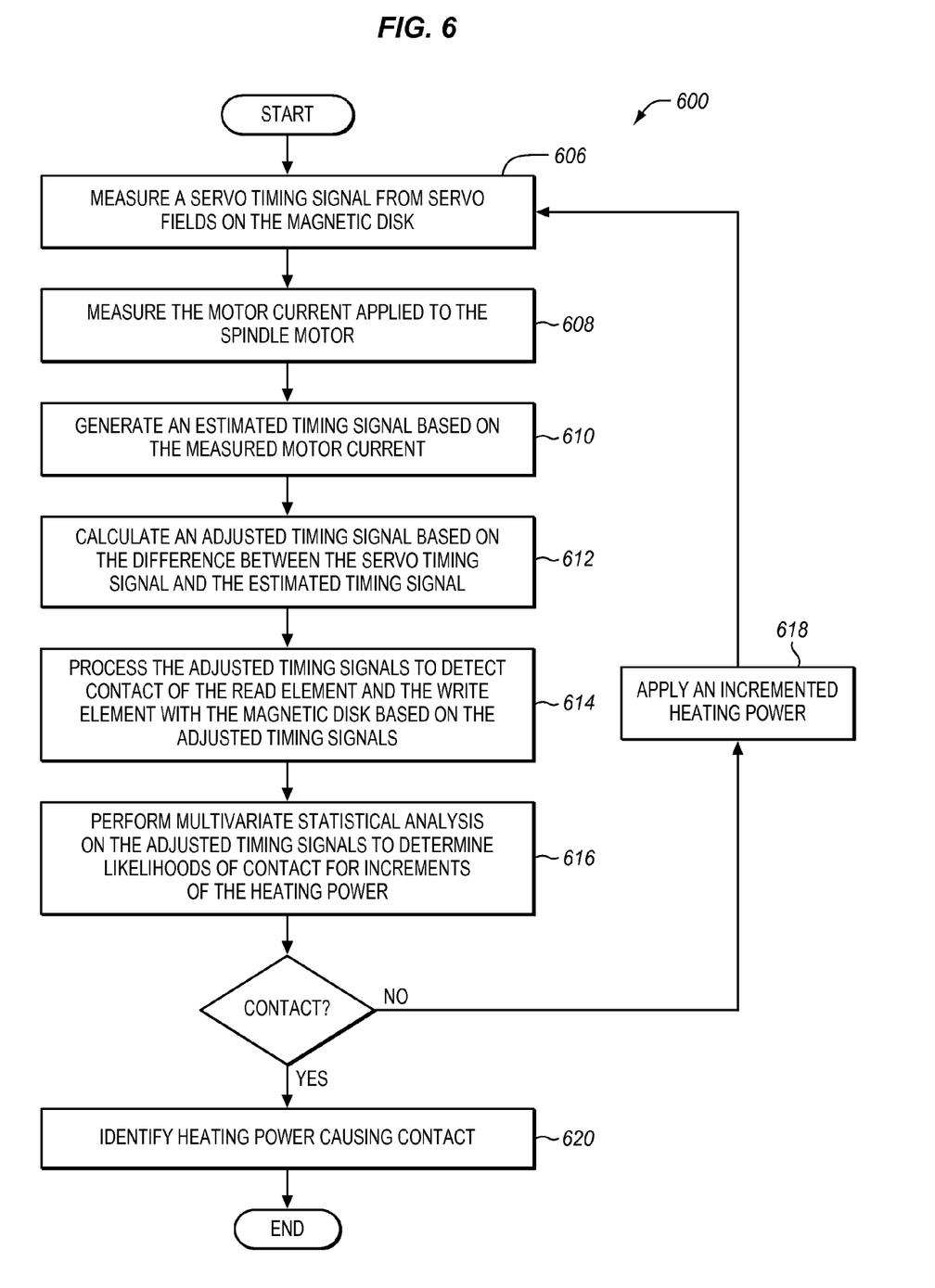
FIG. 6 is a flow chart illustrating a method of detecting contact between read/write elements and a magnetic disk in an exemplary embodiment of the invention.

FIG. 6 is a flow chart illustrating a method 600 of detecting contact between the read/write elements and magnetic disk 104 in an exemplary embodiment of the invention. Method 600 will be discussed in relation to the magnetic disk drive system 100 shown in FIGS. 1-5. The steps of the flow chart in FIG. 6 are not all inclusive and may include other steps not shown.

Spindle motor controller 202 applies a motor current 212 to spindle motor 106 (see also FIGS. 1-2). Responsive to the motor current 212, spindle motor 106 rotates spindle 102 which in turn rotates magnetic disk 104 at a desired rotational speed (RPM). In step 606 of FIG. 6, contact detection system 206 measures a servo timing signal from servo fields on magnetic disk 104. As previously described, magnetic disk 104 includes a plurality of servo regions that include servo fields, such as a sector ID field, burst fields, synchronization fields, etc. As magnetic disk 104 rotates, a servo timing signal may be recovered from the servo fields, which is a function of the rotational speed of magnetic disk 104. Contact detection system 206 also measures the motor current 212 applied to spindle motor 106 (see also FIGS. 1-2) in step 608. The motor current 212 controls the rotational speed of the magnetic disk 104.

In step 610, contact detection system 206 generates an estimated timing signal based on the measured motor current 212. In other words, contact detection system 206 tries to predict a servo timing signal based on the measured motor current 212 instead of using the actual servo timing signal. The estimated timing signal may be generated in a variety of ways.

In one example of generating an estimated timing signal, contact detection system 206 may integrate the measured motor current 212, and enter the integrated motor current into a least square fit algorithm to generate the estimated timing signal. For instance, contact detection system 206 may first enter a "learning mode" to find the relation between integrated motor current and channel sector time to create a least square predictor. In the leaning mode, no heating power 214 is applied to the heating elements, and the measured motor current 212 is integrated. A linear regression is performed between the measured motor current 212 and the servo timing signal to identify the predictor coefficients a and b for the least square fit algorithm. The least square fit algorithm may be the linear equation of $Ay=b$ with matrix $A=[ones(size(Q));Q]$, vector b=the estimated timing signal, vector Q=the integrated motor current, and vector y=2 by 1 solution vector. The linear solution y has the form $y=a*x+b$. The linear regression procedure calculates a and b. Thus, the linear regression is performed to fit a line of the form $Q=a*Timing+b$ between integrated motorcurrent 'Q' and channel timing measurement 'Timing'. The result of the least square fit algorithm is a prediction of the servo timing signal based on the measure motor current 212.

Figure 7:
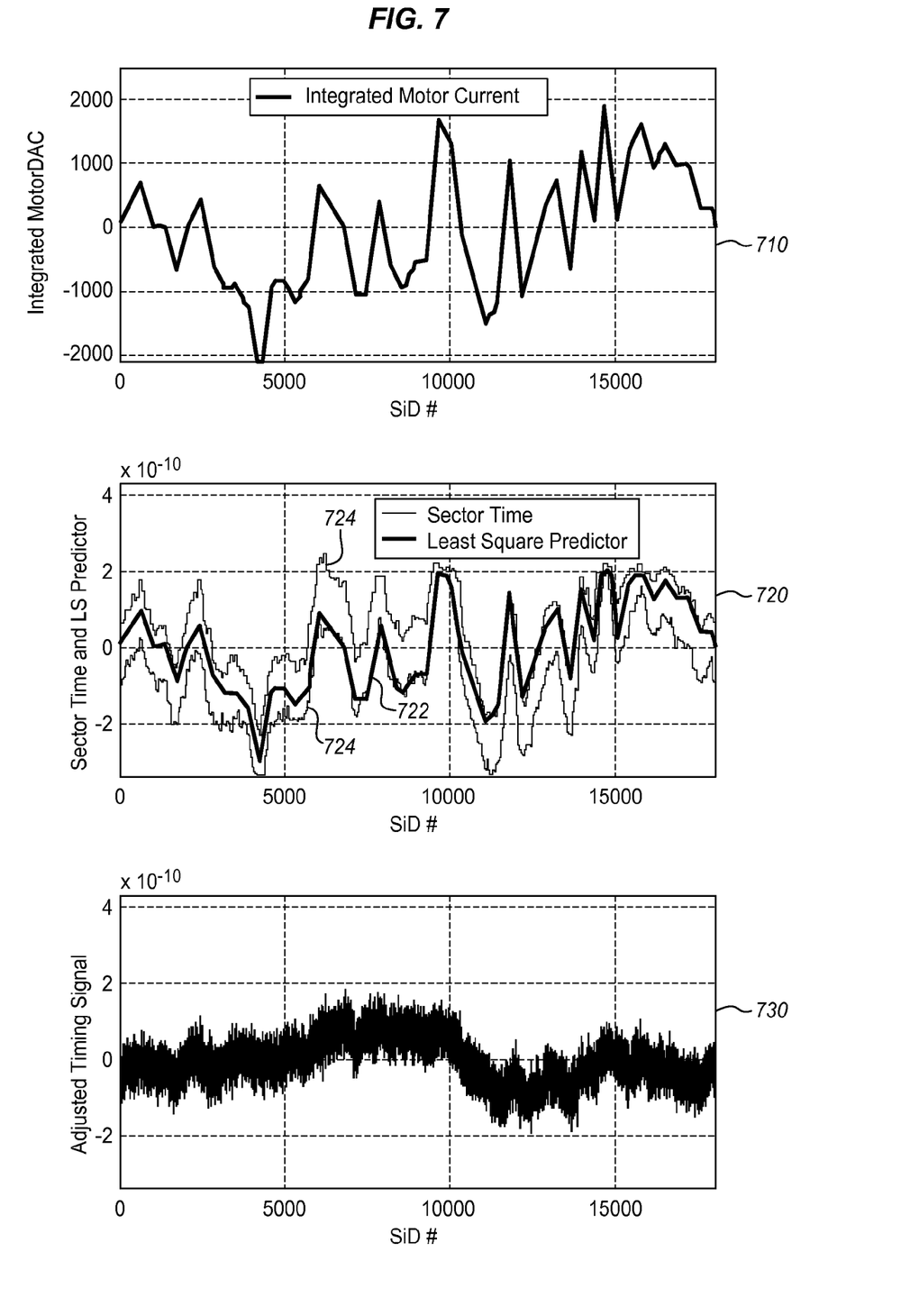
FIG. 7 includes graphs illustrating the results of a least square fit algorithm used to generate an estimated timing signal in an exemplary embodiment of the invention.

FIG. 7 includes graphs illustrating results of a least square fit algorithm used to generate an estimated timing signal. This was done without thermal protrusion applied. However, in this case the calibration was done over 50 consecutive revolutions to better correlate the integrated motor-current with the channel timing measurement. Graph 710 illustrates the measure motor current 212 as integrated by contact detection system 206. Graph 720 illustrates the estimated timing signal produced by the least square fit algorithm. More particularly, line 722 in graph 720 represents the estimated timing signal, while line 724 represents the actual servo timing signal as measured in step 606. Graph 720 shows that the estimated timing signal follows the servo timing signal fairly closely, which means that it is a good prediction of the servo timing signal.

In step 612, contact detection system 206 calculates an adjusted timing signal based on the difference between the servo timing signal and the estimated timing signal. In FIG. 7, graph 720 illustrates the servo timing signal 724 and the estimated timing signal 722, such as generated by the least square fit algorithm. If the estimated timing signal 722 is subtracted from the servo timing signal 724, then the result is an adjusted timing signal shown in graph 730 that that has a much better SNR than the servo timing signal (see line 724 in graph 720).

The clearance calibration process, as previously mentioned, involves increasing the heating power 214 to the heating elements incrementally to cause recording head 114 to contact the surface of magnetic disk 104 (see FIGS. 1-2) after a certain number of revolutions of the magnetic disk. This may be performed for a range of heating powers, such as from 0 mW to 75 mW until there is a strong likelihood of contact. The determination of contact depends on the product used (mobile, desktop, server, etc).

In step 614, contact detection system 206 processes the adjusted timing signal to detect contact of the read/write elements with magnetic disk 104 (i.e., based on the deviation between the servo timing signal and the estimated timing signal). If contact is not detected, then contact detection system 206 instructs heating element controller 204 to increment the heating power 214 in step 618, and the method repeats from step 606 based on the incrementing heating power 214. The amount of increment of the heating power 214 may vary depending on desired implementations, such as 1 mW, 2 mW, etc. Typically, the heating power (TFC power) is turned on for 1 to 5 revolutions and then the data is processed and a decision is made whether contact occurred. If not, the heating power is increased by a few mW. The incremental step-size is determined by a pre-amplifier, which may allow increments in 1 mW steps.

If contact is detected, then method continues to step 620. Contact detection system 206 identifies the heating power 214 that caused the contact of the read/write elements with magnetic disk 104.

Figure 8:
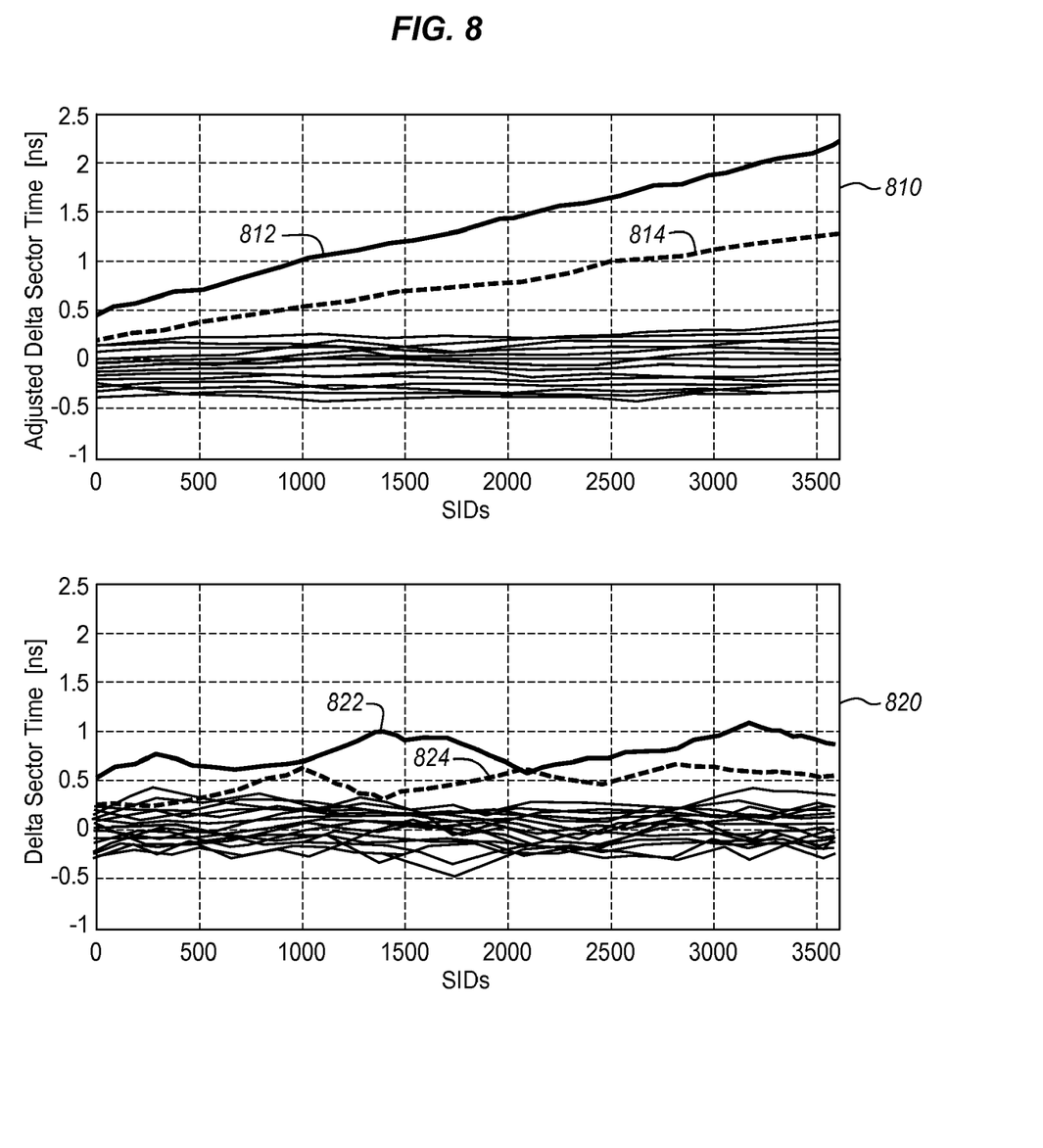
FIG. 8 includes a graph that illustrates a delta of the adjusted timing signals for each increment of heating power in an exemplary embodiment of the invention.

The above process is performed for a range of heating powers 214 until contact is detected. FIG. 8 includes a graph 810 that illustrates a delta of the adjusted timing signals for each increment of the heating power 214. At the last two increments of the heating power 214 (indicated by lines 812 and 814), the delta of the adjusted timing signals show a clear slope. This slope indicates contact between the read/write elements and magnetic disk 104. The delta of the adjusted timing signals has a high SNR so that contact may be clearly detected.

Graph 820 in FIG. 8 illustrates a delta of the servo timing signals for each increment of the heating power 214 as a comparison. At the last two increments of the heating power 214 (indicated by lines 822 and 824), the delta of the servo timing signals do not show a clear slope which indicates that the SNR is lower than with the adjusted timing signals in graph 810.

In step 612 of FIG. 6, the mean, the sigma, and the slope of the adjusted timing signals may also be determined for the increments of the heating power 214. For example, FIG. 9 comprises a graph 910 illustrating the mean (line 912), the sigma (line 914), and the slope (line 916) of the adjusted timing signals as a function of heating power 214. Each of the mean 912, the sigma 914, and the slope 916 of the adjusted timing signals shows a spike after about 65 mW. This spike is indicative of contact between the read/write elements and magnetic disk 104.

Figure 9:
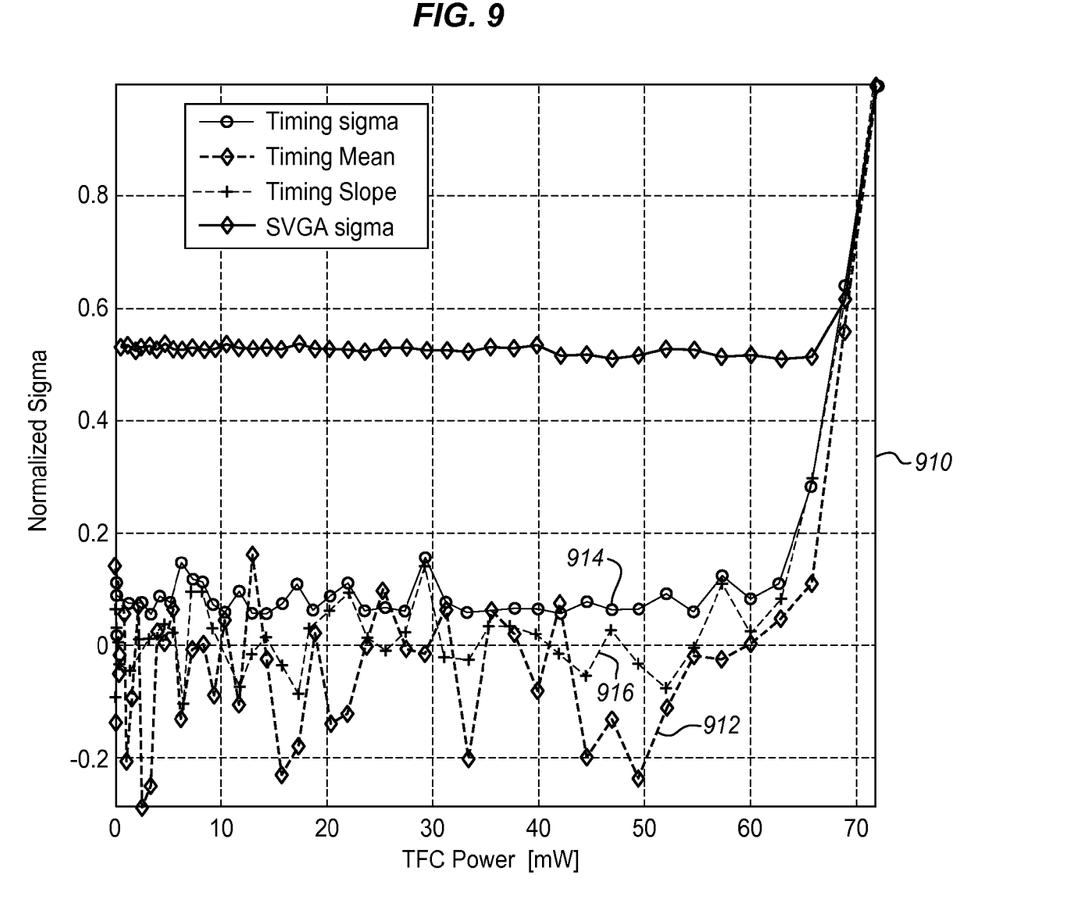
FIG. 9 comprises a graph illustrating the mean, the sigma, and the slope of the adjusted timing signals as a function of heating power in an exemplary embodiment of the invention.
Figure 10:
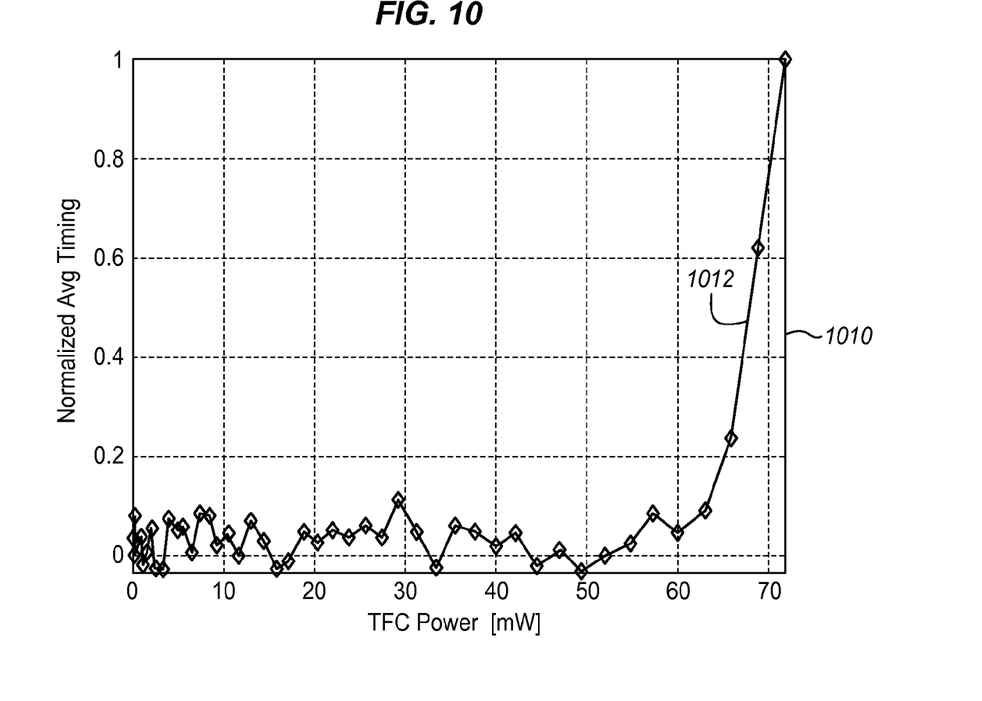
FIG. 10 comprises a graph illustrating the average of the mean, the sigma, and the slope of the adjusted timing signals in an exemplary embodiment of the invention.

Contact detection system 206 may also average the mean 912, the sigma 914, and the slope 916 of the adjusted timing signals as shown in FIG. 9 to get a further indication of contact. FIG. 10 comprises a graph 1010 illustrating the average (line 1012) of the mean 912, the sigma 914, and the slope 916 of the adjusted timing signals. As in FIG. 9, the average 1012 of the adjusted timing signals shows a spike at about 65 mW indicating contact between the read/write elements and magnetic disk 104.

The adjusted timing signals shown above have a higher SNR than the servo timing signals, which advantageously allows contact between the read/write elements to be more precisely detected. As a result, the threshold heating power which caused the contact may be more precisely identified. When magnetic disk drive system 100 is used under normal operation, the threshold heating power should not be exceeded so as to avoid contact between the read/write element and the magnetic disk.

In addition to detecting contact between the read/write elements and magnetic disk 104 as described above, contact detection system 206 may additionally determine a likelihood of contact for each increment of the heating power 214. In optional step 616 of FIG. 6, contact detection system 206 performs multivariate statistical analysis on the adjusted timing signals to determine likelihoods of contact for the increments of the heating power 214. The input variables for the multivariate statistical analysis may vary depending on desired implementations. In one embodiment, the input variables are the sigma of the adjusted timing signals (see FIG. 9), the mean of the adjusted timing signals (see FIG. 9), the slope of the adjusted timing signals (see FIG. 9), the mean and sigma of a current applied to VCM 108 (see FIG. 1), the mean and sigma of the Position Error Signal (PES), and the mean and sigma of the servo variable gain amplitude (SVGA). The statistical behavior of the noisy measurement parameters is observed in the non-contact state and a model is constructed based on these observations. In one embodiment, the noisy measurement parameters are modeled as a Gaussian random vector having a probability mass function:

$$f_X(x_1, \ldots x_n) = \frac{1}{(2\pi)^{N/2}|\Sigma|^{1/2}} \exp\left(-\frac{1}{2}(x-\mu)^T \Sigma^{-1}(x-\mu)\right)$$

where x is the vector of noisy observations and $\mu$, $\Sigma$, and N are parameters of the model. This expression may be interpreted as a measure of how consistent a set of noisy measurements are with the typical behavior of the system in a non-contact state. Atypical measurements, yielding a low value of fx are not likely to be observed if the system is in a non-contact state. A low value of fx therefore indicates that the head is likely to be in contact with the disk.

Figure 11:
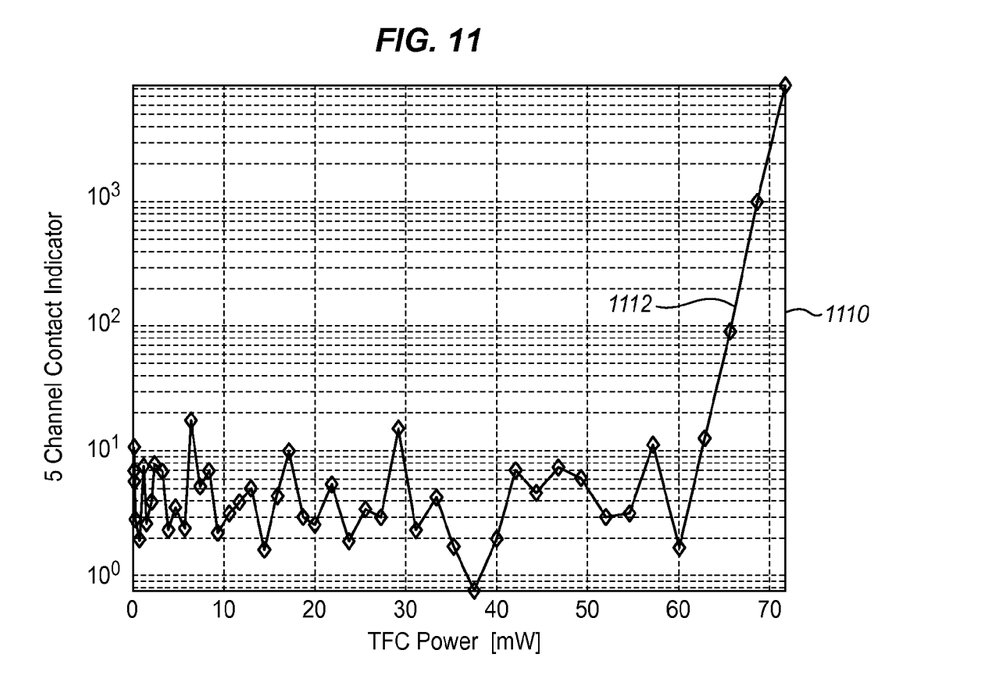
FIG. 11 comprises a graph illustrating the likelihood of contact as a function of heating power in an exemplary embodiment of the invention.

FIG. 11 comprises a graph 1110 illustrating the likelihood of contact as a function of heating power 214. At a heating power 214 of about 65 mW, the likelihood (line 1112) of contact is about 10 times more than the likelihood of contact at lesser powers. At a heating power 214 of about 70 mW, the likelihood of contact is over 100 times more than the likelihood of contact at heating powers less than 65 mW. The likelihoods generated from the multivariate statistical analysis provide further assurance that the contact was precisely detected from the adjusted timing signals. Instead of using a single contact indicator (such as 'SVGA' bouncing increase by >30% over baseline), it is advantageous to monitor multiple channels simultaneously and make a decision based on the multivariate probability distribution.

Figure 12:
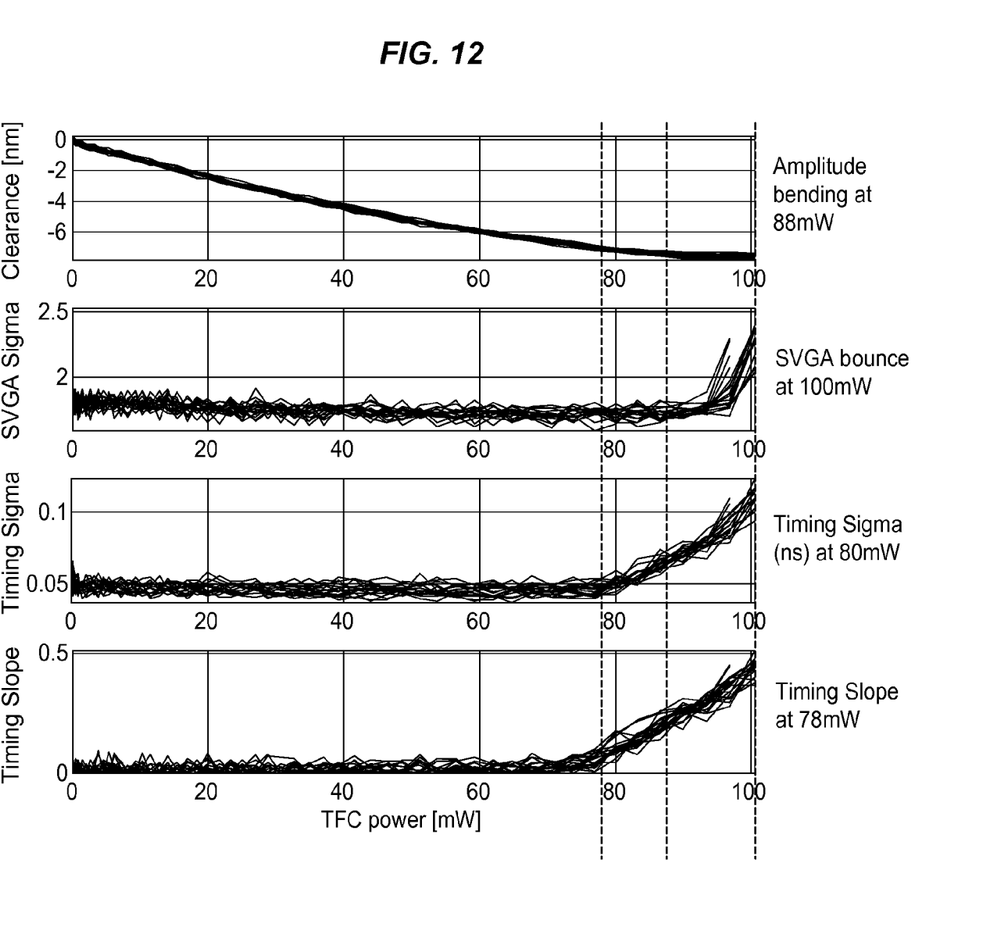
FIG. 12 are graphs illustrating the advantages of detecting contact using the methods described herein compared to prior methods.

FIG. 12 are graphs illustrating the advantages of detecting contact using the adjusted timing based detection over SVGA bounce and amplitude bending (reduced TFC efficiency) methods suggested in prior art. This plot shows 500 consecutive touchdowns using SVGA bounce as a contact indicator. In all 4 subplots, the x-axis is thermal protrusion power (TFC power). The first plot shows the drop in clearance with increased power. Clearance change is deducted from the readback signal amplitude using the Wallace Spacing Equation. As the read/write elements approach the magnetic disk, the clearance levels off because the readback signal amplitude cannot increase further at about 88 mW of TFC power. The variation of the readback signal (SVGA sigma) is shown in the second plot. This indicates onset of slider flying height modulation for TFC powers exceeding 95 mW. The third plot shows timing sigma (which is indicative of a downtrack jitter measurements). It detects contact at about 80 mW. The fourth plot in FIG. 12 shows the timing slope versus TFC power. Contact can be detected at a TFC power of around 78 mW, which is about 10 mW prior to the clearance leveling off and about 20 mW prior to the onset of slider bouncing vibrations. That is to say, the sensitivity of using timing based detection is so high that a grazing contact may be detected where the slider is only barely touching the lube/asperities on the disk. The lube and asperities are getting 'compressed' as the slider TFC power increases from 78 mW to 88 mW (comparing the first and fourth plot of FIG. 12).

Although specific embodiments were described herein, the scope of the invention is not limited to those specific embodiments. The scope of the invention is defined by the following claims and any equivalents thereof.

We claim:

1. A method of detecting contact between a recording head and a magnetic disk in a magnetic disk drive system, wherein the recording head includes a heating element adapted to cause a protrusion of a read element and a write element in the recording head, the method comprising:
    measuring a servo timing signal from servo fields on the magnetic disk;
    measuring a motor current applied to a spindle motor in the magnetic disk drive system;
    generating an estimated timing signal based on the measured motor current;
    calculating an adjusted timing signal based on the difference between the servo timing signal and the estimated timing signal;
    processing the adjusted timing signal to detect contact of the read element and the write element of the recording head with the magnetic disk based on the adjusted timing signal;
    if contact is not detected, then:
        incrementing a heating power applied to the heating element to cause a protrusion of the read element and the write element in the recording head; and
        repeating the prior steps based on the incremented heating power; and
    if contact is detected, then identifying a heating power causing the contact.

2. The method of claim 1 wherein generating an estimated timing signal based on the measured motor current comprises:
    integrating the measured motor current; and
    entering the integrated motor current into a least square fit algorithm to generate the estimated timing signal.

3. The method of claim 1 wherein processing the adjusted timing signal to detect contact of the read element and the write element of the recording head with the magnetic disk based on the adjusted timing signal comprises:
    determining at least one of a mean, a slope, and a sigma of the adjusted timing signal; and
    detecting the contact of the read element and the write element of the recording head with the magnetic disk based on the at least one of the mean, the slope, and the sigma of the adjusted timing signal.

4. The method of claim 3 further comprising:
    averaging the mean, the slope, and the sigma of the adjusted timing signal to generate an average timing signal as a function of heating power; and
    detecting the contact of the read element and the write element of the recording head with the magnetic disk based on the average timing signal.

5. The method of claim 1 further comprising:
    performing multivariate statistical analysis on the adjusted timing signal and at least one other variable to determine likelihoods of contact.

6. The method of claim 5 wherein performing multivariate statistical analysis comprises performing the multivariate statistical analysis based on the following variables:
    the sigma of the adjusted timing signal;
    the mean of the adjusted timing signal;
    the slope of the adjusted timing signal;
    the mean of a voice coil motor (VCM) current;
    the sigma of the voice coil motor (VCM) current;
    the mean of a position error signal (PES);
    the sigma of the position error signal (PES);
    the sigma of a servo variable gain amplitude (SVGA); and
    the mean of the servo variable gain amplitude (SVGA).

7. A control system of a magnetic disk drive system that is adapted to detect contact between a recording head and a magnetic disk in the magnetic disk drive system, wherein the recording head includes a heating element adapted to cause a protrusion of a read element and a write element in the recording head, the control system comprising:
    a spindle motor controller adapted to apply a motor current to the spindle motor to rotate the magnetic disk;
    a heating element controller adapted to apply a heating power to the heating element to cause a protrusion of the read element and the write element toward the magnetic disk; and
    a contact detection system adapted to:
        measure a servo timing signal from servo fields on the magnetic disk;
        measure the motor current applied to the spindle motor;
        generate an estimated timing signal based on the measured motor current;
        calculate an adjusted timing signal based on the difference between the servo timing signal and the estimated timing signal;
        process the adjusted timing signal to detect contact of the read element and the write element of the recording head with the magnetic disk based on the adjusted timing signal;
        if contact is not detected, then the contact detection system is further adapted to:
            instruct the heating element controller to increment a heating power applied to the heating element; and
            repeat the prior steps based on the incremented heating power; and
        if contact is detected, then the contact detection system is further adapted to identify a heating power causing the contact.

8. The control system of claim 7 wherein the contact detection system is further adapted to:
    integrate the measured motor current; and
    enter the integrated motor current into a least square fit algorithm to generate the estimated timing signal.

9. The control system of claim 7 wherein the contact detection system is further adapted to:
    determine at least one of a mean, a slope, and a sigma of the adjusted timing signal; and
    detect the contact of the read element and the write element of the recording head with the magnetic disk based on the at least one of the mean, the slope, and the sigma of the adjusted timing signal.

10. The control system of claim 9 wherein the contact detection system is further adapted to:
    normalize and weight-average the mean, the slope, and the sigma of the adjusted timing signal to generate an average timing signal as a function of heating power; and
    detect the contact of the read element and the write element of the recording head with the magnetic disk based on the average timing signal.

11. The control system of claim 7 wherein the contact detection system is further adapted to:
perform multivariate statistical analysis on the adjusted timing signal and at least one other variable to determine likelihoods of contact for the increments of the heating power.

12. The control system of claim 11 wherein the contact detection system is further adapted to perform multivariate statistical analysis based on:
the sigma of the adjusted timing signal;
the mean of the adjusted timing signal;
the slope of the adjusted timing signal;
the mean of a voice coil motor (VCM) current;
the sigma of the voice coil motor (VCM) current;
the mean of a position error signal (PES);
the sigma of the position error signal (PES);
the sigma of a servo variable gain amplitude (SVGA); and
the mean of the servo variable gain amplitude (SVGA).

13. A magnetic disk drive system, comprising:
a spindle motor connected to a spindle and adapted to rotate the spindle;
a magnetic disk connected to the spindle;
a recording head having a heating element adapted to cause a protrusion of a read element and a write element toward the magnetic disk; and
a control system adapted to:
measure a servo timing signal from servo fields on the magnetic disk;
measure a motor current applied to the spindle motor;
generate an estimated timing signal based on the measured motor current;
calculate an adjusted timing signal based on the difference between the servo timing signal and the estimated timing signal;
process the adjusted timing signal to detect contact of the read element and the write element of the recording head with the magnetic disk based on the adjusted timing signal;
if contact is not detected, then the control system is further adapted to:
instruct the heating element controller to increment a heating power applied to the heating element; and
repeat the prior steps based on the incremented heating power; and
if contact is detected, then the control system is further adapted to identify a heating power causing the contact.

14. The magnetic disk drive system of claim 13 wherein the control system is further adapted to:
integrate the measured motor current; and
enter the integrated motor current into a least square fit algorithm to generate the estimated timing signal.

15. The magnetic disk drive system of claim 13 wherein the control system is further adapted to:
determine at least one of a mean, a slope, and a sigma of the adjusted timing signal; and
detect the contact of the read element and the write element of the recording head with the magnetic disk based on the at least one of the mean, the slope, and the sigma of the adjusted timing signal.

16. The magnetic disk drive system of claim 15 wherein the control system is further adapted to:
average the mean, the slope, and the sigma of the adjusted timing signal to generate an average timing signal as a function of heating power; and
detect the contact of the read element and the write element of the recording head with the magnetic disk based on the average timing signal.

17. The magnetic disk drive system of claim 13 wherein the control system is further adapted to:
perform multivariate statistical analysis on the adjusted timing signal and at least one other variable to determine likelihoods of contact for the increments of the heating power.

18. The magnetic disk drive system of claim 17 wherein the control system is further adapted to perform multivariate statistical analysis based on:
the sigma of the adjusted timing signal;
the mean of the adjusted timing signal;
the slope of the adjusted timing signal;
the mean of a voice coil motor (VCM) current;
the sigma of the voice coil motor (VCM) current;
the mean of a position error signal (PES);
the sigma of the position error signal (PES);
the sigma of a servo variable gain amplitude (SVGA); and
the mean of the servo variable gain amplitude (SVGA).

* * * * *

UNITED STATES PATENT AND TRADEMARK OFFICE
CERTIFICATE OF CORRECTION

PATENT NO.         : 7,508,618 B1
APPLICATION NO.    : 11/965637
DATED              : March 24, 2009
INVENTOR(S)        : Herbst et al.

Page 1 of 1

It is certified that error appears in the above-identified patent and that said Letters Patent is hereby corrected as shown below:

On the title page insert item (73), --HITACHI GLOBAL STORAGE TECHNOLOGIES NETHERLANDS B.V.--.

At column 2, line 62, the text "tie difference" should read --the difference--.

At column 3, line 67, the text "Those sildled" should read --Those skilled--.

At column 6, line 18, the text "In the leaning mode" should read
--In the learning mode--.

At column 8, line 14, the text "and sigina" should read --and sigma--.

Signed and Sealed this

Twenty-third Day of June, 2009

JOHN DOLL
*Acting Director of the United States Patent and Trademark Office*